3,163,640
PROCESS FOR THE PREPARATION OF HEXAKIS (1-AZIRIDINYL) PHOSPHONITRILE
Rudi F. W. Rätz, Hamden, and Miriam J. Gruber, New Haven, Conn., assignors to Olin Mathieson Chemical Corporation, New Haven, Conn., a corporation of Virginia
No Drawing. Filed Apr. 17, 1963, Ser. No. 273,566
3 Claims. (Cl. 260—239)

This invention relates to an improved process for the preparation of hexakis(1-aziridinyl) phosphonitrile, also known as 2,2,4,4,6,6 - hexakis(1 - aziridinyl)cyclophosphaza-1,3,5-triene, an insect sterilant.

The preparation of this compound has previously been described by Rätz et al. in U.S. 2,858,306 wherein trimeric phosphonitrilic chloride $(Cl_2PN)_3$ was reacted with ethylenimine in benzene solution in the presence of a tertiary base. The process described therein is an excellent laboratory procedure, but it is not easily adaptable for practical use in commercial operations since there are several factors which make the process inefficient and uneconomical in such operations.

For example, the aforementioned process requires the use of at least a 25% molar excess of ethylenimine over the theoretical stoichiometric amount in order to obtain a satisfactory yield of aziridinyl derivative. The recovery of this excess amount of costly ethylenimine is impractical, and this feature adversely affects the commercial attractiveness of the process.

Filtration problems have also been encountered when the process described in the cited patent is used in the preparation of large amounts of the aziridinyl derivative. The tertiary base hydrochloride obtained in accordance with the above cited process is a voluminous precipitate, and filtration procedures involved in removing this salt from the reaction mixture are tedious and time consuming. It has been found that filtrations performed under pressure are preferably used in the removal of such salts.

Finally, the use of the solvents disclosed in the Rätz et al. reference does not assure an efficient separation of the aziridinyl derivative from the tertiary base hydrochloride. For example, when benzene is used as a solvent, some of the aziridinyl derivative crystallizes from solution with the bulk of the hydrochloride salt thus complicating the separation of these materials. Similarly, the tertiary base hydrochloride is sufficiently soluble in benzene so that some of it remains in solution with the bulk of the aziridinyl derivative. Aside from the obvious separation problems thus presented, it has been found that the aziridinyl derivative undergoes some polymerization when in extended contact with the organic hydrochloride salts, and therefore a quick and efficient separation of these materials is especially desirable.

The primary object of this invention is to provide a process for the preparation of hexakis(1-aziridinyl)phosphonitrile which is free of the aforementioned process deficiencies. Another object of this invention is to provide an efficient and economical process for the preparation of substantial amounts of the aziridinyl derivative. Still another object is to provide a process for the preparation of the desired aziridinyl derivative which is not characterized by filtration problems. Other objects of this invention are evident from the following discussion.

These objects have been accomplished in accordance with this invention. It has been found that hexakis(1-aziridinyl)phosphonitrile can be economically prepared in substantial amounts and in high purity by the reaction of trimeric phosphonitrilic chloride with ethylenimine in a chloroform solution using ammonia as an acid acceptor. The aziridinyl derivative is completely soluble in all proportions in chloroform while the formed ammonium chloride is essentially completely insoluble in chloroform and precipitates from solution as fast as it is formed. The resulting precipitate is a granular material, and it can be conveniently and completely removed from the reaction mixture by routine methods as, for example, by suction or even by gravity filtration. Thus, the improved process of this invention allows the preparation of the aziridinyl derivative free of the aforementioned filtration problems. In addition, polymerization of the aziridinyl derivative through contact with organic base hydrochloride is avoided. Such improvements make the process of this invention especially suitable for large scale preparations of the insect sterilant.

The successful utilization of ammonia as an acid acceptor in this process was unexpected since it is known that ammonia readily reacts with phosphonitrilic chlorides wherein at least partial amidation of the phosphonitrilic ring could be expected. However, none of the easily formed 2,4-diamino-substituted phosphonitrilic compound was obtained during the practice of this process, and in every preparation performed in accordance with this procedure the theoretical amount of ammonium chloride was removed from the reaction mixture.

When triethylamine was substituted for ammonia in this process the resulting hydrochloride is completely soluble in chloroform and cannot be removed by filtration techniques. Also, the aziridinyl derivative begins to polymerize because of the contact with the organic salt in chloroform solution.

The process of this invention also surprisingly obviates the necessity of employing a molar excess of ethylenimine since high yields of the desired product are obtained by the use of only a stoichiometric amount. As noted, the previously reported preparations of the aziridinyl derivative have involved the use of a considerable molar excess of ethylenimine.

A critical feature of the hereindescribed process is that the trimeric phosphonitrilic chloride must be added to the ethylenimine-ammonia solution in order to obtain high yields of pure product. Inadequate yields of the aziridinyl derivative are obtained when the reverse addition procedure is employed. The chloride may be added as a solid to the ethylenimine solution if so desired, but the better and preferred procedure is to add a chloroform solution of the phosphonitrilic chloride to the ethylenimine solution.

In general, hexakis(1-aziridinyl)phosphonitrile can be prepared by the process of this invention at a temperature range of from about $-10°$ C. to about $40°$ C. However, it is preferred to maintain a reaction temperature of about $0°$ to $10°$ C. during the actual addition of the phosphonitrilic chloride to the ethylenimine solution.

The ammonia acid acceptor should be used in an amount of at least six moles for each mole of phosphonitrilic chloride employed as a reactant. It is convenient to utilize an ammonia saturated chloroform solution of ethylenimine, but, of course, such saturated solution must contain at least the above minimum amount of ammonia.

There are several additional features associated with this novel process which make it a convenient and economic method of preparing the desired derivative. For example, a minimum amount of solvent may be brought into contact at very high concentrations in the chloroform solvent. The chloroform can also be recovered in nearly quantitative amount. The phosphonitrilic chloride can be added very rapidly to the ethylenimine while maintaining a low reaction temperature with a cold water bath. Finally, of course, ammonia is a much cheaper acid acceptor than the organic tertiary bases hereinbefore utilized.

The following examples will serve to illustrate the preparation of the aziridinyl derivative in accordance with the process of this invention.

Example 1

Into a one liter three-necked reaction flask equipped with stirrer, condenser and gas inlet tube was placed 200 ml. of dry chloroform. Ammonia gas was passed into the solvent at 0° C. until the solvent was saturated. Then 26.0 g. (0.60 mole) of ethylenimine was added to the ammonia solution. A solution of 34.8 g. (0.1 mole) of trimeric phosphonitrilic chloride $(Cl_2PN)_3$ in 150 ml. of chloroform was placed in a dropping funnel and added over a 45 minute period to the ethylenimine-ammonia solution while maintaining the reaction temperature at 0°–5° C. with external cooling. The reaction mixture was stirred for five hours at 0° to 5° C. and then allowed to stand at ambient temperature for three days. The reaction mixture was then filtered under suction, and 31.3 g. of granular ammonium chloride was easily removed and isolated. This amount compares with the theoretical amount of 32.1 g. of ammonium chloride which would be obtained if complete reaction had occurred. The clear filtrate was evaporated at 45° C./14 mm. to complete dryness, and 37.5 g. of colorless, free-flowing powder was then obtained. This material was recrystallized from a mixture of carbon tetrachloride-ligroin (80:20 by volume) to provide 28.7 g. of a chlorine-free crystalline product having a melting point of 151° C. This product can be recrystallized from dimethylacetamide to give shining prismatic crystals, M.P. 157° C. The following analytical data revealed that 2,2,4,4,6,6-hexakis(1 - aziridinyl)cyclotriphosphaza-1,3,5-triene had been obtained in high purity. Yield: 74%.

*Analysis.*—Calcd. for $C_{12}H_{24}N_9P_3$: C, 37.21; H, 6.24; N, 32.55; P, 24.00. Found: C, 37.18; H, 6.24; N, 32.50; P, 23.96.

Example 2

Into a five liter three-necked flask equipped with stirrer, gas inlet tube and double jacketed condenser was placed 800 ml. of chloroform. The solvent was saturated with ammonia gas at a temperature of about 0° C. After addition of 136.5 g. (3.1 moles) of freshly distilled ethylenimine to the solvent, the gas inlet tube was replaced by a 500 ml. dropping funnel. A clear solution of 174.0 g. (0.5 mole) of trimeric phosphonitrilic chloride in 500 ml. of chloroform was added dropwise over a two hour period to the flask at 0° to 5° C. The reaction mixture was stirred for 4 hours longer at the same temperature range. Finally, ammonia was passed into the reaction mixture for 15 minutes at room temperature. The reaction mixture was allowed to stand for three days at ambient temperature without stirring. The mixture was filtered under suction and the theoretical amount (160.5 g.) of ammonium chloride was quickly removed. Evaporation of the clear and colorless chloroform filtrate at 40° C./14 mm. yielded a colorless solid which melted at 149.5°–151° C. The infrared spectrum of this material did not show any $NH_2$-band. Yield: 166.5 g.; 86.5%. After one recrystallization from 1240 ml. of carbon tetrachloride, a chlorine-free product was obtained. A mixed melting point of this material and the material of Example 1 revealed that the products were identical.

What is claimed is:

1. A process for preparing hexakis(1-aziridinyl)phosphonitrile which comprises reacting trimeric phosphonitrilic chloride with at least a stoichiometric amount of ethylenimine in chloroform solution, said chloroform solution containing at least six moles of ammonia based on each mole of trimeric phosphonitrilic chloride reactant.

2. A process for preparing hexakis(1-aziridinyl)phosphonitrile which comprises adding trimeric phosphonitrilic chloride to a stoichiometric amount of ethylenimine in chloroform solution at a temperature of about −10° C. to about 40° C., said chloroform solution containing at least an equivalent molar amount of ammonia based on molar amount of ethylenimine in the solution.

3. A process for preparing hexakis(1-aziridinyl)phosphonitrile which comprises adding trimeric phosphonitrilic chloride to a stoichiometric amount of ethylenimine in chloroform solution at a temperature of about −10° C. to about 40° C., said chloroform solution being saturated with ammonia and containing at least an equivalent molar amount of ammonia based on molar amount of ethylenimine in the solution, filtering ammonium chloride from the reaction mixture and recovering the product from the filtrate.

References Cited by the Examiner
UNITED STATES PATENTS 2,858,306  10/58  Rätz et al. _____ 260—239

IRVING MARCUS, *Primary Examiner.*

NICHOLAS S. RIZZO, *Examiner.*